United States Patent
Kurasawa et al.

(10) Patent No.: US 10,282,017 B2
(45) Date of Patent: May 7, 2019

(54) DISPLAY DEVICE AND TOUCH DETECTION METHOD OF DISPLAY DEVICE

(71) Applicant: Japan Display Inc., Tokyo (JP)

(72) Inventors: Hayato Kurasawa, Tokyo (JP); Hiroshi Mizuhashi, Tokyo (JP); Koji Noguchi, Tokyo (JP); Takafumi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 176 days.

(21) Appl. No.: 15/359,473

(22) Filed: Nov. 22, 2016

(65) Prior Publication Data

US 2017/0153752 A1  Jun. 1, 2017

(30) Foreign Application Priority Data

Nov. 27, 2015 (JP) .................. 2015-231995

(51) Int. Cl.
*G06F 3/041* (2006.01)
*G02F 1/1333* (2006.01)
(Continued)

(52) U.S. Cl.
CPC ............ *G06F 3/0416* (2013.01); *G02F 1/137* (2013.01); *G02F 1/1368* (2013.01);
(Continued)

(58) Field of Classification Search
CPC ........... G02F 1/133345; G02F 1/13338; G02F 1/133512; G02F 1/13394; G02F 1/134336;
(Continued)

(56) References Cited

U.S. PATENT DOCUMENTS

2005/0140858 A1* 6/2005 Park .................... G02F 1/13394
349/110
2013/0342498 A1 12/2013 Kim et al.
(Continued)

FOREIGN PATENT DOCUMENTS

JP      2000-066837 A      3/2000
JP      2001-27762 A       1/2001
(Continued)

OTHER PUBLICATIONS

Japanese Office Action dated Feb. 26, 2019, for application serial No. 2015-231995.

*Primary Examiner* — Viet D Pham
(74) *Attorney, Agent, or Firm* — Michael Best & Friedrich LLP

(57) ABSTRACT

According to one embodiment, a display device includes a plurality of gate lines, a plurality of data lines intersecting with the gate lines, a plurality of pixel electrodes provided in areas defined by the gate lines and the data lines, and a sensor drive controller which includes a plurality of common electrodes facing the pixel electrodes and detects a touch by using the common electrodes. The sensor drive controller selects at least one of the common electrodes as a sensor electrode, detects a touch by using the sensor electrode, and inputs, to the other common electrodes, a guard signal for reducing generation of capacitance between the other common electrodes and the sensor electrode.

18 Claims, 13 Drawing Sheets

(51) Int. Cl.

| | | |
|---|---|---|
| G02F 1/1335 | (2006.01) | |
| G02F 1/1339 | (2006.01) | |
| G02F 1/1343 | (2006.01) | |
| G02F 1/1362 | (2006.01) | |
| G02F 1/1368 | (2006.01) | |
| G02F 1/137 | (2006.01) | |
| G06F 3/044 | (2006.01) | |
| G09G 3/36 | (2006.01) | |

(52) U.S. Cl.
CPC ...... *G02F 1/13338* (2013.01); *G02F 1/13394* (2013.01); *G02F 1/133512* (2013.01); *G02F 1/134336* (2013.01); *G02F 1/136286* (2013.01); *G06F 3/044* (2013.01); *G06F 3/0412* (2013.01); *G09G 3/3677* (2013.01); *G09G 3/3688* (2013.01); *G02F 1/133345* (2013.01); *G02F 2201/121* (2013.01); *G02F 2201/123* (2013.01); *G06F 2203/04107* (2013.01)

(58) Field of Classification Search
CPC .. G02F 1/136286; G02F 1/1368; G02F 1/137; G02F 2201/121; G02F 2201/123; G06F 3/0412; G06F 3/0416; G06F 3/044; G09G 3/3677; G09G 3/3688
See application file for complete search history.

(56) References Cited

U.S. PATENT DOCUMENTS

| | | | |
|---|---|---|---|
| 2014/0049486 A1 | 2/2014 | Kim et al. | |
| 2014/0049508 A1 | 2/2014 | Kim et al. | |
| 2014/0226083 A1* | 8/2014 | Dunphy | G06F 3/044 349/12 |
| 2015/0091843 A1* | 4/2015 | Ludden | G06F 3/044 345/174 |
| 2015/0091850 A1 | 4/2015 | Morein et al. | |
| 2016/0098114 A1* | 4/2016 | Pylvas | G06F 3/0412 345/174 |

FOREIGN PATENT DOCUMENTS

| | | |
|---|---|---|
| JP | 2014-164752 A | 9/2014 |
| JP | 2015-64854 A | 4/2015 |
| JP | 2015-72686 A | 4/2015 |
| JP | 2015-79236 A | 4/2015 |

* cited by examiner

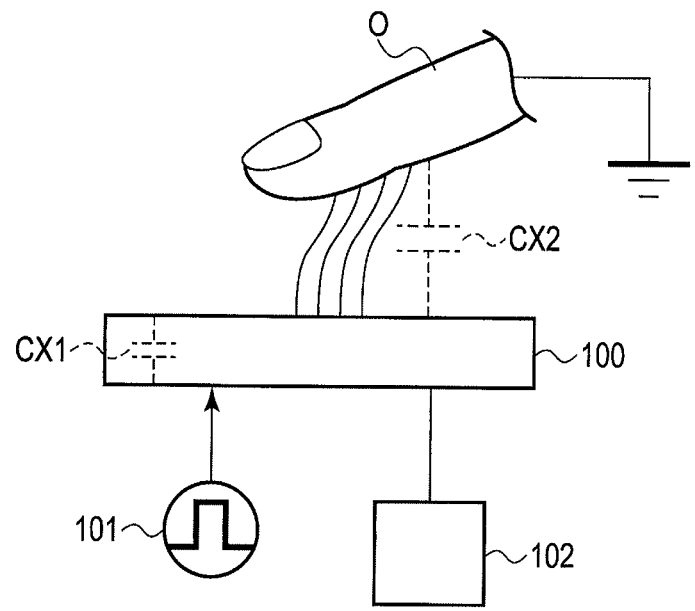
F I G. 1
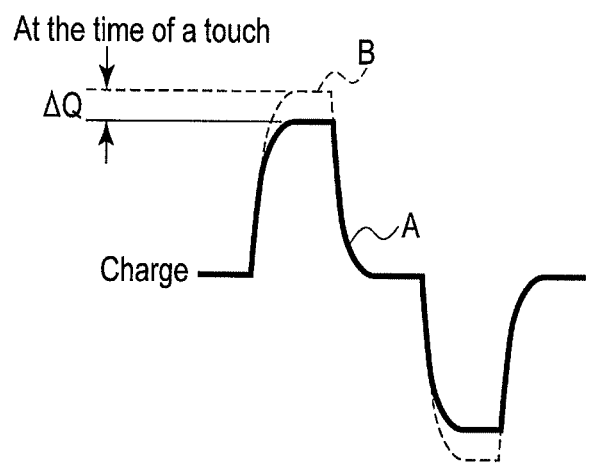
F I G. 2

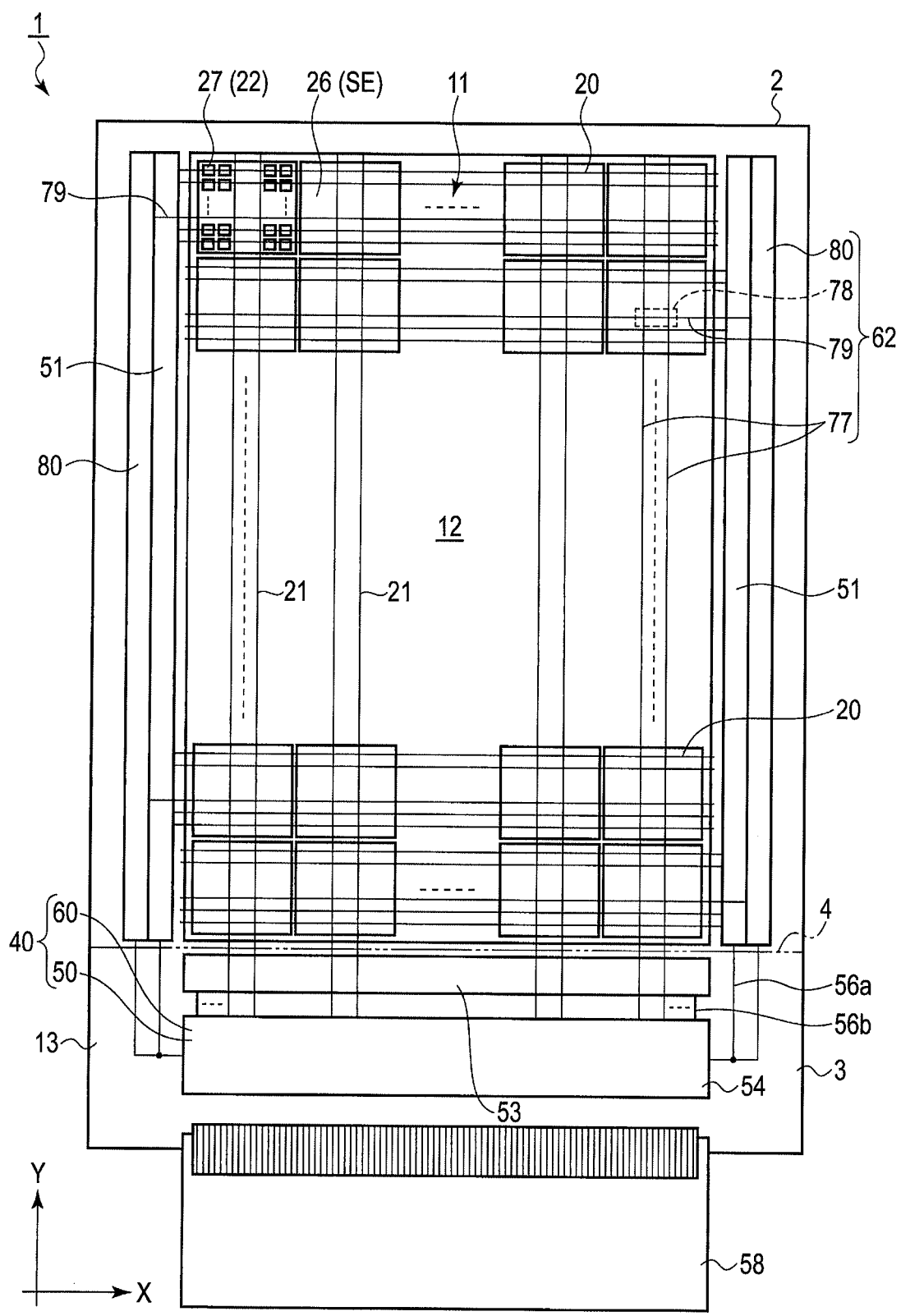
F I G. 3

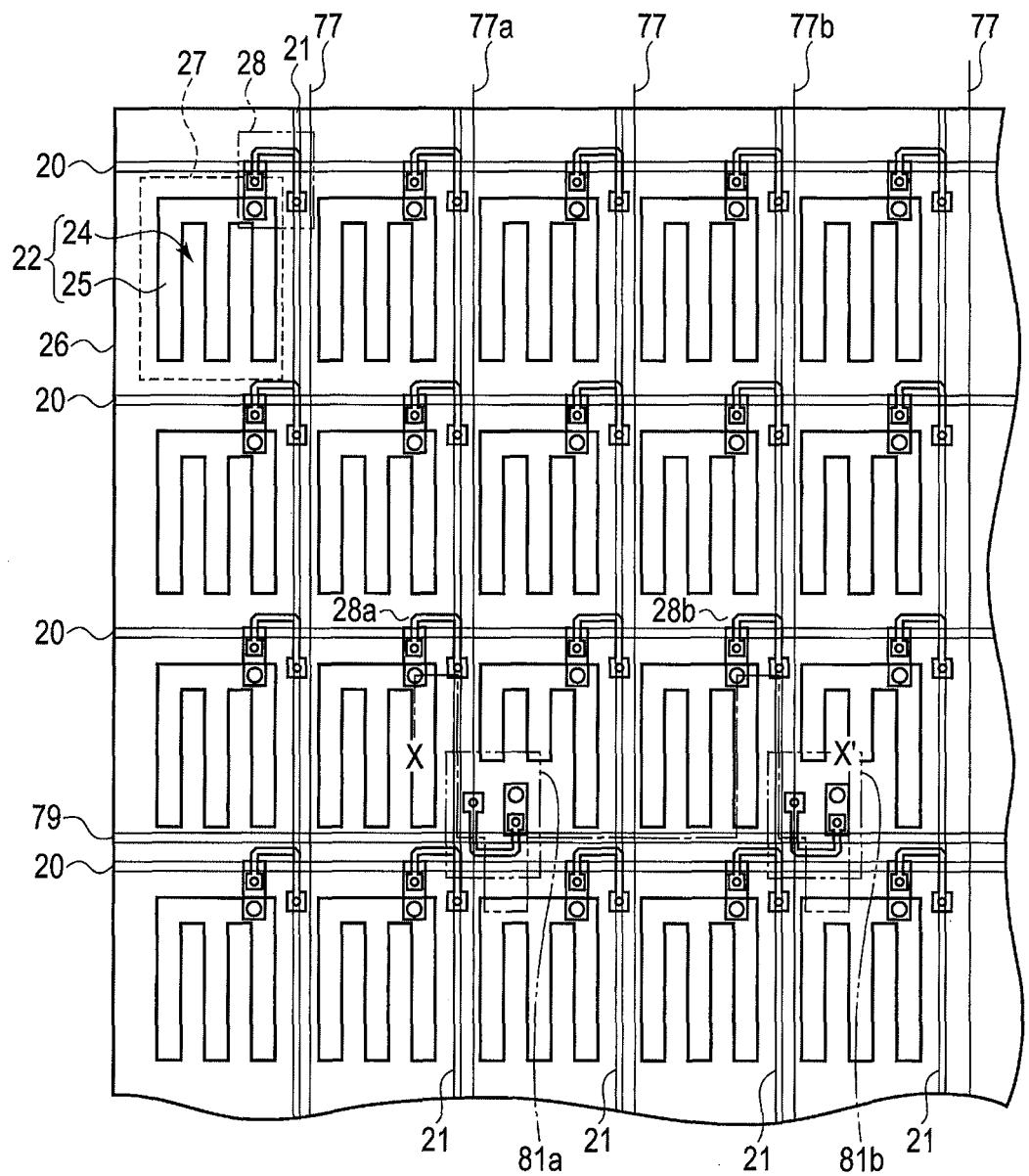
F I G. 4

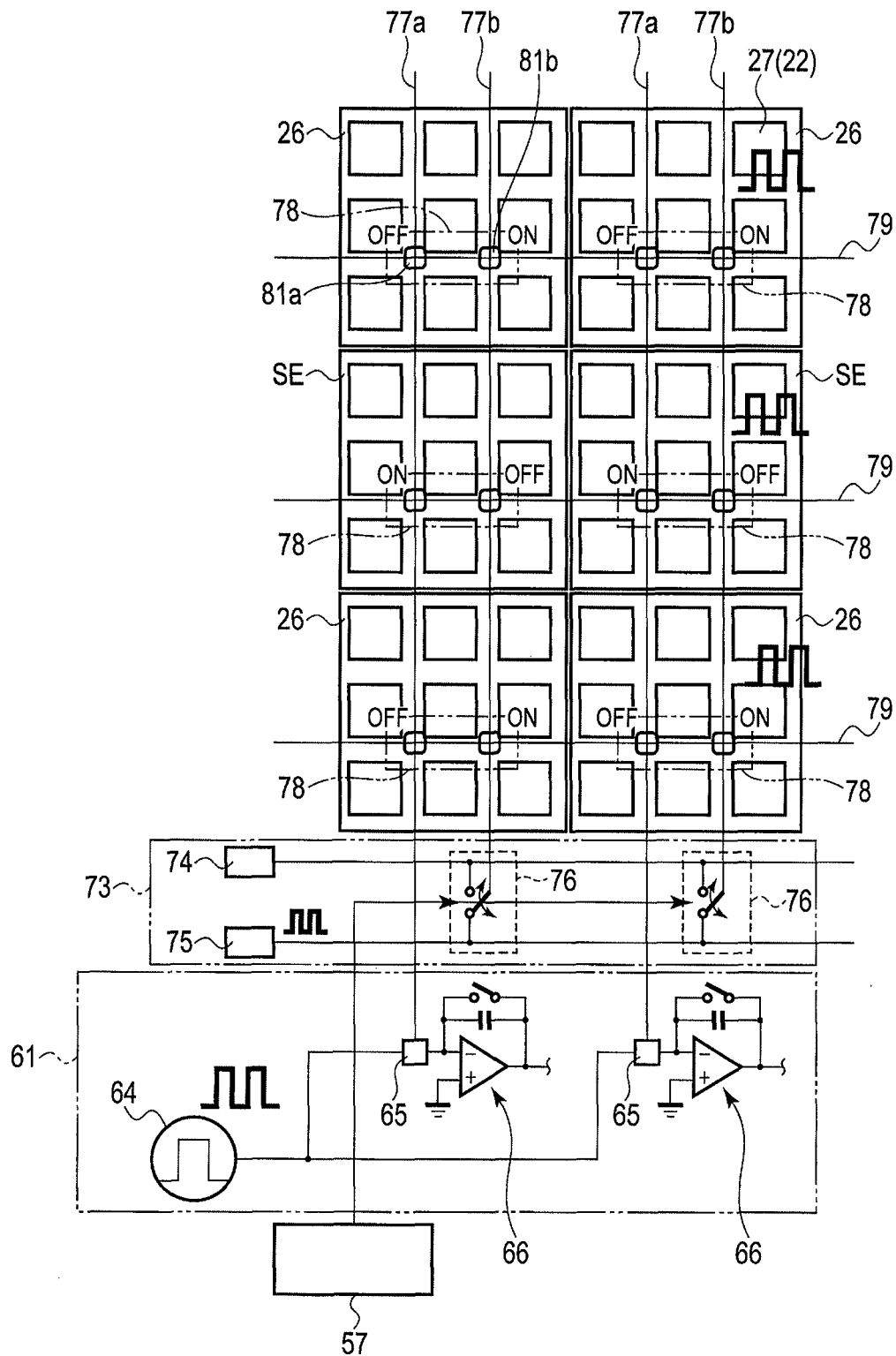
F I G. 9

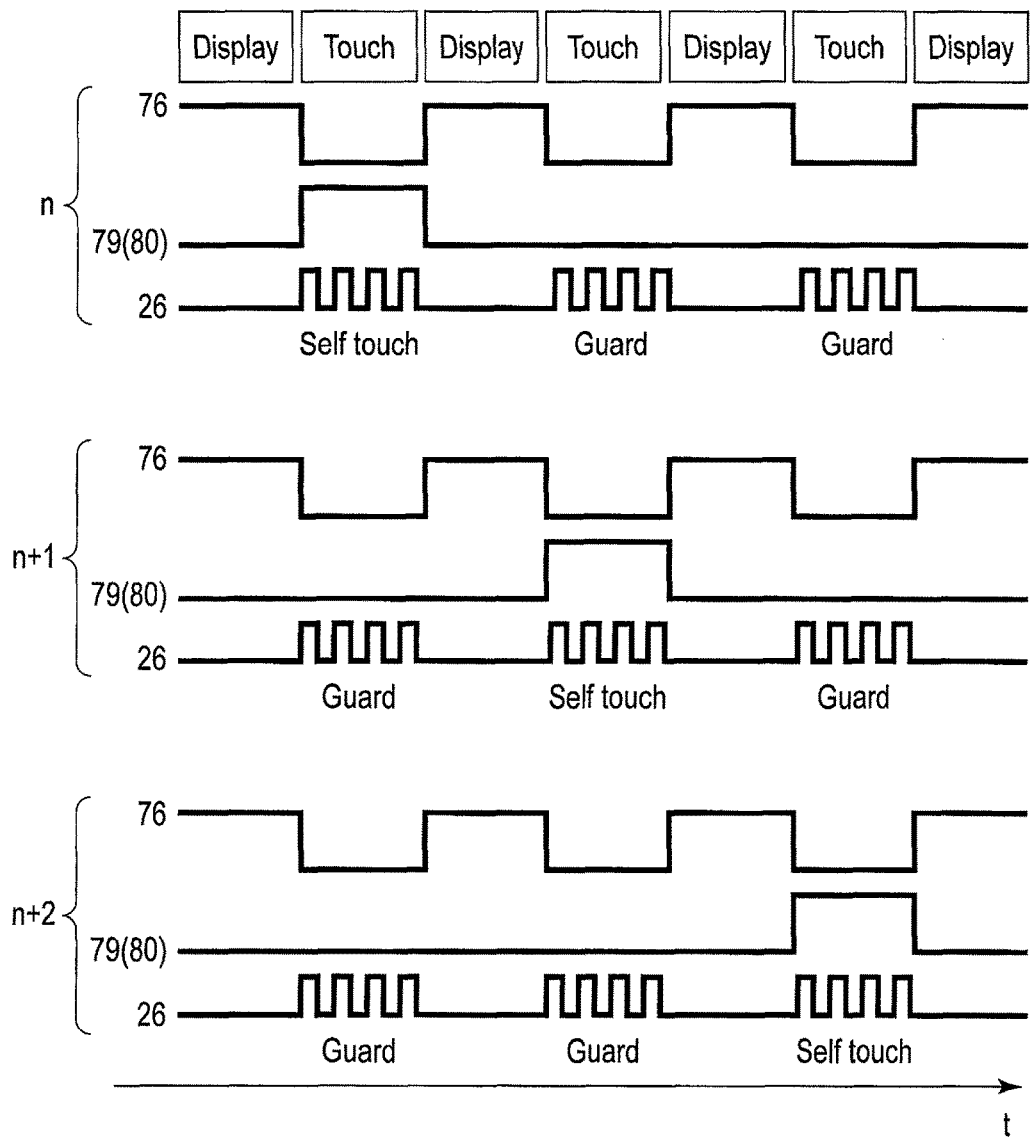
F I G. 10

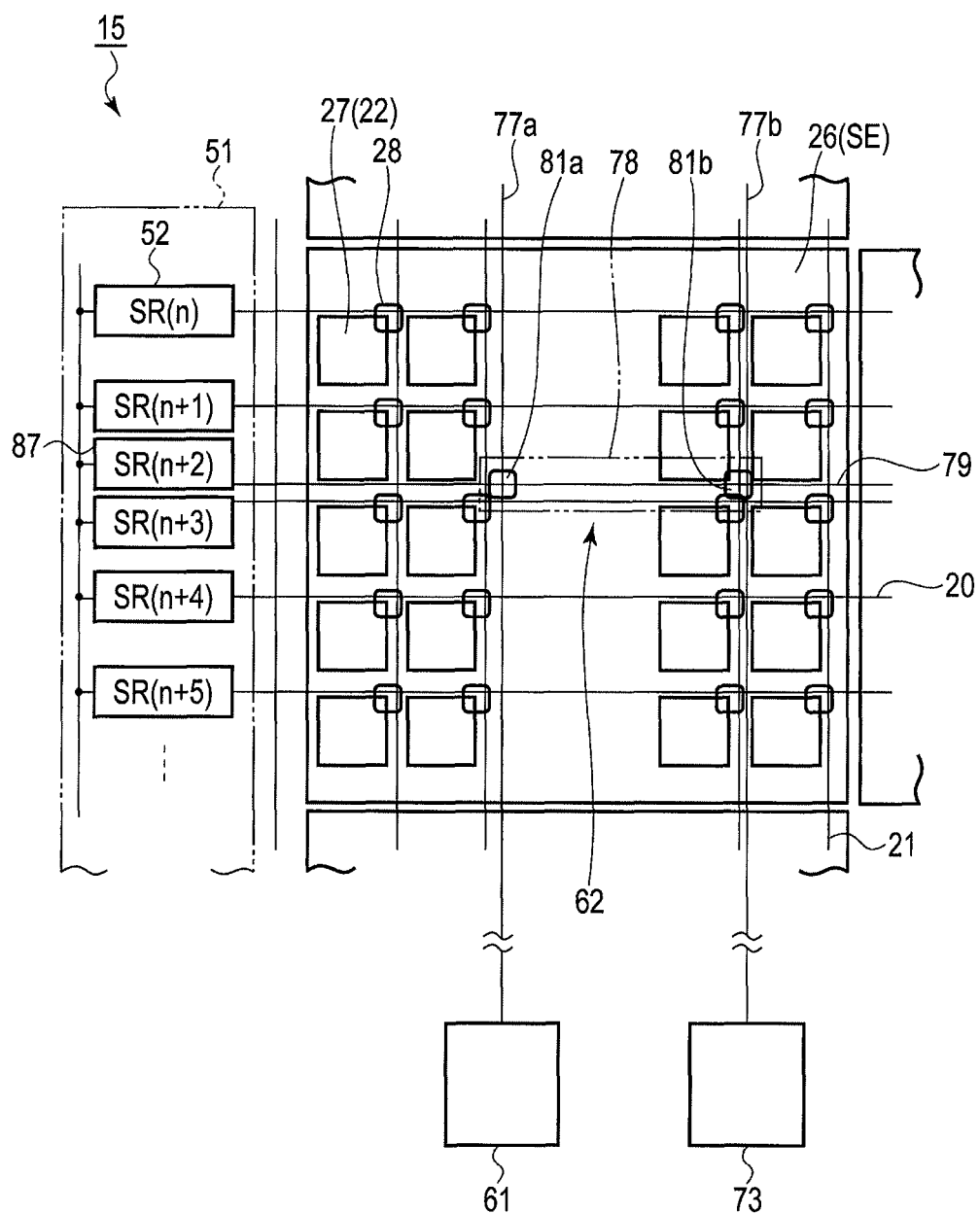
F I G. 11

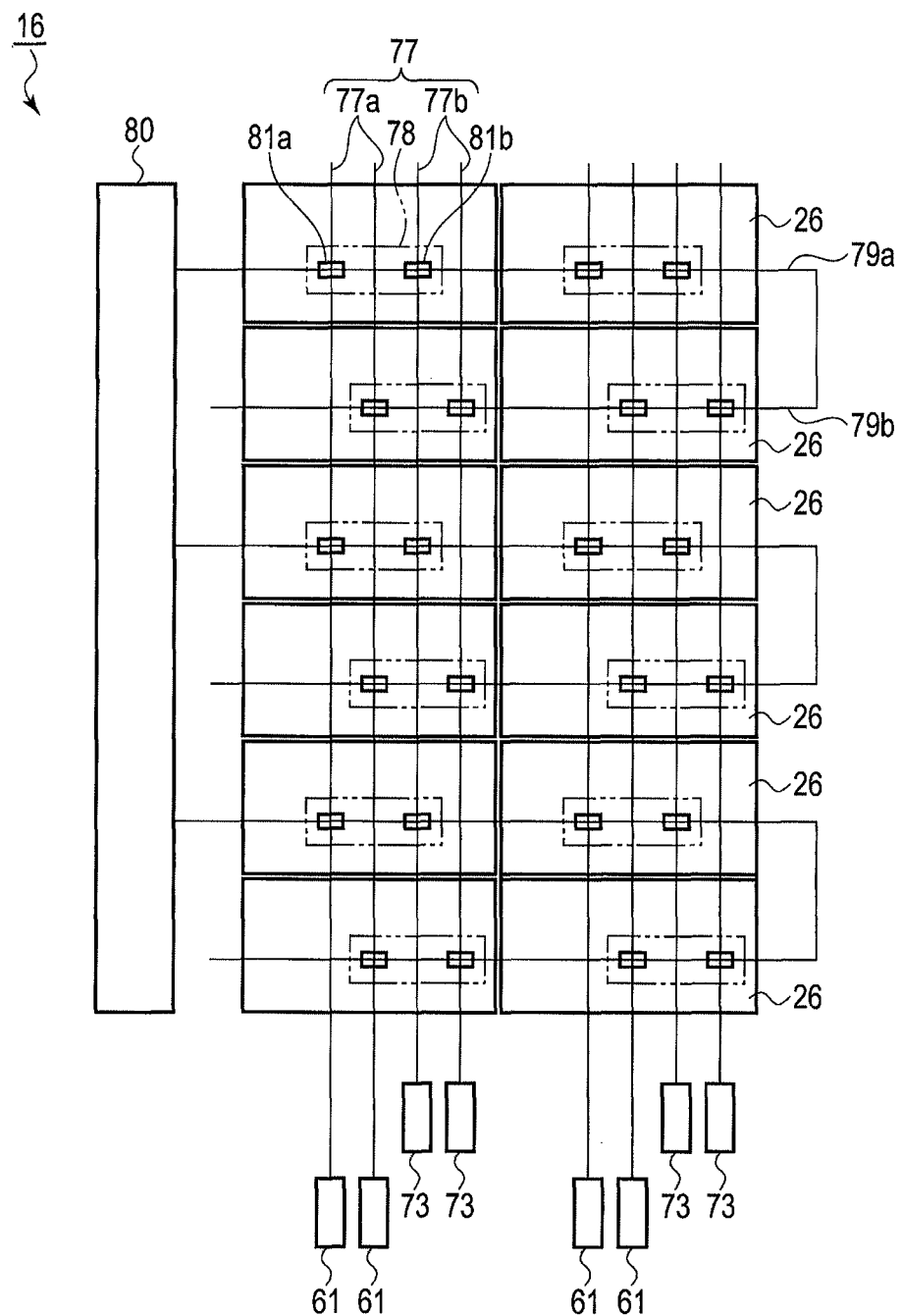
F I G. 12

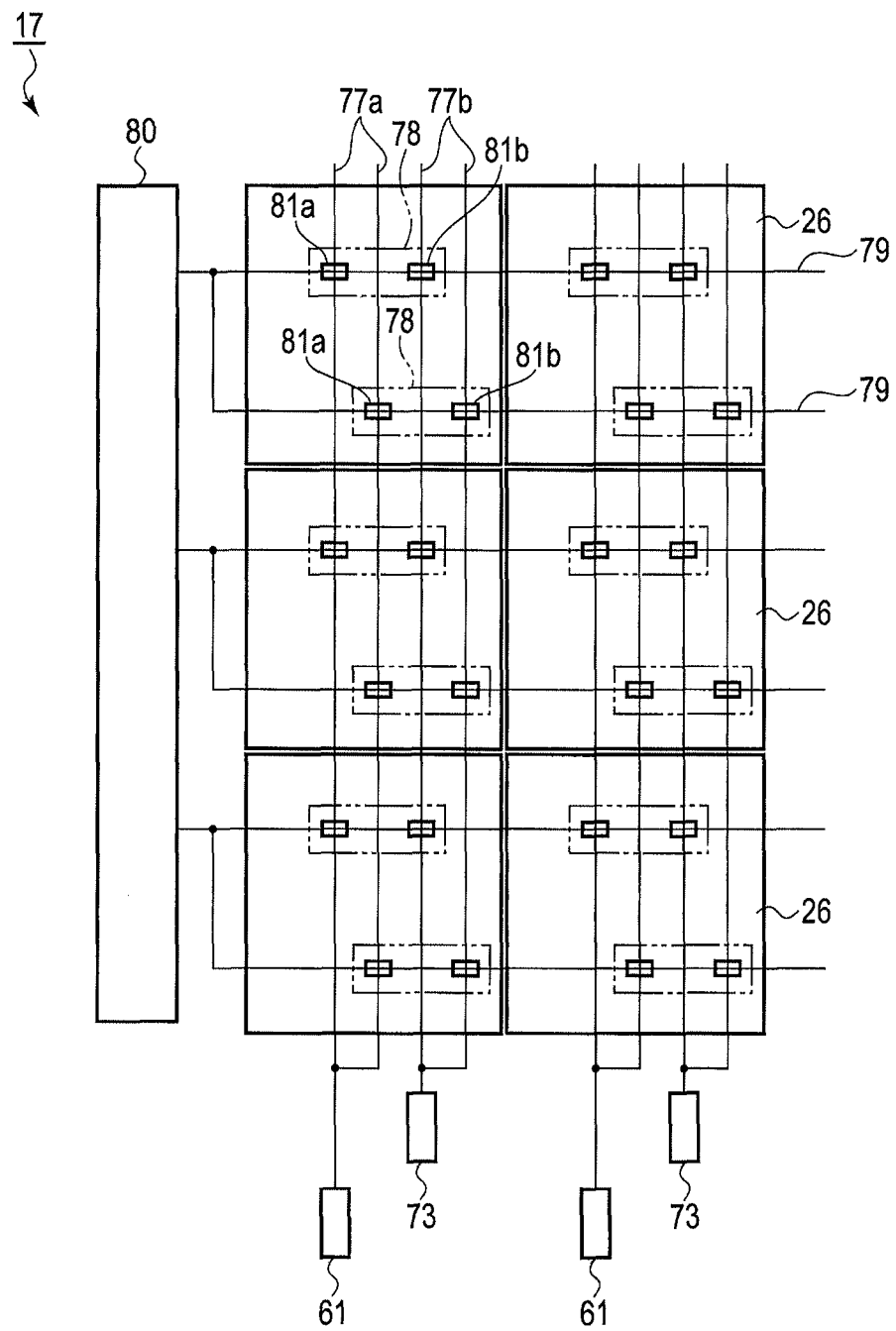
F I G. 13

… (1)

DISPLAY DEVICE AND TOUCH DETECTION METHOD OF DISPLAY DEVICE

CROSS-REFERENCE TO RELATED APPLICATIONS

This application is based upon and claims the benefit of priority from Japanese Patent Application No. 2015-231995, filed Nov. 27, 2015, the entire contents of which are incorporated herein by reference.

FIELD

Embodiments described herein relate generally to a display device and a touch detection method of a display device.

BACKGROUND

In general, display device which can be applied to mobile communication terminal called smartphone or tablet computer, the communication terminal uses a composition that can operate the display devise by touching a means for inputting data, such as a stylus or fingers, into contact with a display surface which displays an image. As this type of the display device, there are in-cell type of display device in which a touch detection function is partially or entirely incorporated into a display panel, and on-cell type of the display device which is provided a sensor having a touch detection function on the display surface of a display panel.

As the above in-cell type display device having a touch detection function, the following structure is known. Sensor electrodes formed of a transparent conductive film such as indium tin oxide (ITO) or indium zinc oxide (IZO) are provided in matrix in the display area which displays an image. A detection circuit is provided so as to correspond to each sensor electrode. Further, the sensor electrodes are connected to the detection circuits by thin metal lines.

However, the conventional display devices having a touch detection function require the same number of detection circuits as the number of sensor electrodes. Thus, it is difficult to respond to increase in the number of sensor electrodes, to improvement of detection performance or to increase in the size of the display panel.

BRIEF DESCRIPTION OF THE DRAWINGS

FIG. 1 schematically shows touch detection by a self-capacitive system.

FIG. 2 is a graph showing change in capacitance when a touch is detected by a self-capacitive system.

FIG. 3 is a plan view schematically showing the structure of a liquid crystal display device having a touch detection function according to a first embodiment.

FIG. 4 is a plan view showing the pixel structure of the liquid crystal display device having a touch detection function according to the first embodiment.

FIG. 9 is another plan view schematically showing an enlarged view of some structures of the liquid crystal display device having a touch detection function according to the first embodiment.

FIG. 10 is a timing chart showing the sequence of driving the liquid crystal display device having a touch detection function according to the first embodiment.

FIG. 11 is a plan view schematically showing an enlarged view of some structures of a liquid crystal display device having a touch detection function according to a second embodiment.

FIG. 12 is a plan view schematically showing an enlarged view of some structures of a liquid crystal display device having a touch detection function according to a third embodiment.

FIG. 13 is a plan view schematically showing an enlarged view of some structures of a liquid crystal display device having a touch detection function according to a fourth embodiment.

DETAILED DESCRIPTION

Figure 5:
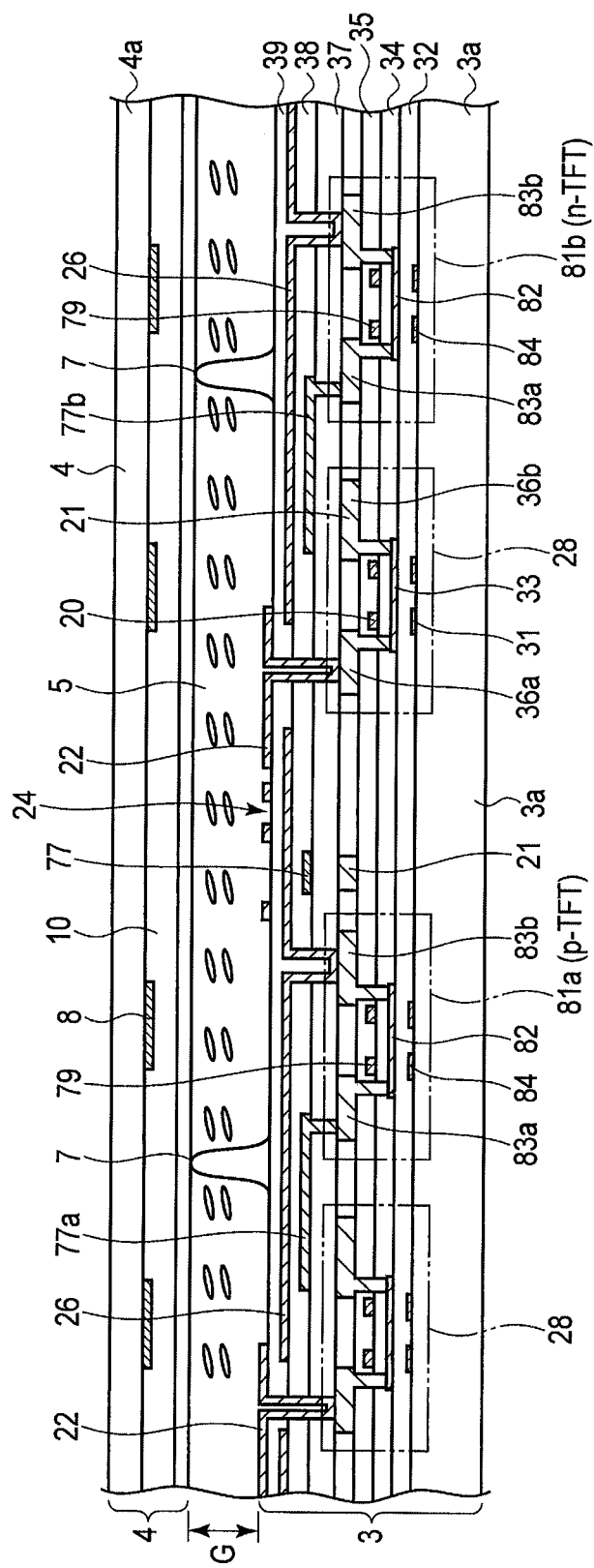
FIG. 5 is a cross-sectional view showing the layer structure of the liquid crystal display device having a touch detection function along dashed line X-X' of FIG. 4 according to the first embodiment.

The embodiments of the present invention provide a display device which does not require the same number of detection circuits as the number of sensor electrodes, and a touch detection method of the display device.

In general, according to one embodiment, a display device comprises:

a plurality of gate lines;

a plurality of data lines intersecting with the gate lines;

a plurality of pixel electrodes provided in areas defined by the gate lines and the data lines;

a plurality of common electrodes opposing to the pixel electrodes; and a sensor drive controller which detects a touch by using the common electrodes, wherein the sensor drive controller selects at least one of the common electrodes as a sensor electrode, detects a touch by using the sensor electrode, and inputs a guard signal to the other common electrodes, the guard signal reducing a occurrence of capacitance between the other common electrodes and the sensor electrode.

According to another embodiment, a display device comprises:

a plurality of gate lines;

a plurality of data lines intersecting with the gate lines;

a plurality of pixel electrodes provided in areas defined by the gate lines and the data lines; and a sensor drive controller which comprises a plurality of common electrodes facing the pixel electrodes, and detects a touch by using the common electrodes, wherein the sensor drive controller selects at least one of the common electrodes as a sensor electrode, and is formed as a self-capacitive system for inputting a sensor signal to the sensor electrode and detecting change in the sensor signal.

According to yet another embodiment, a display device comprises:

a plurality of gate lines;

a plurality of data lines intersecting with the gate lines;

a plurality of pixel electrodes provided in areas defined by the gate lines and the data lines; and a sensor drive controller which comprises a plurality of common electrodes facing the pixel electrodes, and detects a touch by using the common electrodes, wherein the sensor drive controller comprises a plurality of detection circuits for detecting a touch, and a plurality of select circuits which selectively connect the detection circuits and a specific common electrode, and the detection circuits are less than the common electrodes in number.

According to one embodiment, in a touch detection method of a display device, the display device comprises:

a plurality of gate lines;

a plurality of data lines intersecting with the gate lines;

a plurality of pixel electrodes provided in areas defined by the gate lines and the data lines; and a plurality of common electrodes facing the pixel electrodes.

The method comprises:

selecting at least one of the common electrodes as a sensor electrode;

detecting a touch by using the sensor electrode; and inputting, to the other common electrodes, a guard signal for reducing generation of capacitance between the other common electrodes and the sensor electrode.

According to another embodiment, in a touch detection method of a display device, the display device comprises:

a plurality of gate lines;

a plurality of data lines intersecting with the gate lines;

a plurality of pixel electrodes provided in areas defined by the gate lines and the data lines; and a plurality of common electrodes facing the pixel electrodes.

The method comprises:

selecting at least one of the common electrodes as a sensor electrode; and subsequently detecting a touch by a self-capacitive system for supplying a sensor signal to the sensor electrode and detecting change in capacitance of the sensor signal.

The embodiments of the present invention will further be described with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

(Touch Detection by Self-Capacitive System)

At first this specification explains the basic principle of touch detection by a self-capacitive system in a display device having a touch detection function according to each embodiment of the present invention.

FIG. 1 schematically shows touch detection by a self-capacitive system (a self-detection system). Touch detection means that contact or adjacency of a detection object with or to a sensor electrode is detected using the sensor electrode.

As shown in FIG. 1, touch detection by a self-capacitive system is performed by supplying a sensor signal 101 to a sensor electrode 100 and reading change in the sensor signal (specifically, change in the capacitance of the sensor signal). The sensor signal is changed in connection with contact or adjacency of a detection object O which can be regarded as a dielectric substance such as fingers or a stylus (hereinafter, simply referred to as a detection object) with or to the sensor electrode 100. The change in the sensor signal is detected by a detection circuit 102.

Touch detection by a self-capacitive system uses a capacitance $Cx1$ of the sensor electrode and a capacitance $Cx2$ generated by the detection object O adjacent to the sensor electrode 100.

In FIG. 2, solid line A shows temporal change of the sensor signal when the detection object O is neither in contact with nor adjacent to the sensor electrode 100. Since the detection object O is not close to the sensor electrode 100, no capacitance is generated between the sensor electrode SE and the detection object O. Only capacitance $Cx1$ of the sensor electrode is generated. The sensor signal read by the detection circuit 102 exhibits the temporal change shown by solid line A in accordance with the input to the sensor electrode 100.

When the detection object O approaches or makes in contact with the sensor electrode 100 from the above state, capacitance $Cx2$ is generated between the sensor electrode 100 and the detection object O. By capacitance $Cx2$, a large amount of current is supplied to the sensor electrode SE. In FIG. 2, the dashed line shows change in the sensor signal in accordance with the charge amount when the detection object O is adjacent to the sensor electrode 100. As shown by the dashed line, the change is larger by charge amount $\Delta Q$ than that when the detection object O is not present. This difference is detected by the detection circuit 102, and thus, the state of adjacency of the detection object O is determined.

First Embodiment

Now, this specification explains the details of a display device having a touch detection function and a method of driving the display device according to a first embodiment with reference to the accompanying drawings.

As shown in FIG. 3, in the present embodiment, a display device 1 having a touch detection function comprises a liquid crystal display panel 2 in an active matrix type, and a backlight unit (not shown) provided on the rear side of the liquid crystal display panel 2. The display device 1 having a touch detection function displays an image with the light emitted from the backlight unit such that the surface opposite to the rear surface on which the backlight unit is provided is a display surface 11.

Hereinafter, a state in which the display surface 11 is viewed in the normal direction of the display surface 11 is called a plan view.

The liquid crystal display panel 2 comprises a first substrate 3, a second substrate 4 facing the first substrate 3, and a liquid crystal layer (the liquid crystal layer 5 shown in FIG. 5 later) provided between the first substrate 3 and the second substrate 4. The second substrate 4 faces the first substrate 3 on the display surface 11 side.

A rectangular display area 12 which allows the display surface 11 to display an image is provided on the liquid crystal display panel 2. Further, a frame-like non-display area 13 is provided around the display area 12 on the liquid crystal display panel 2.

The display area 12 may have a different shape such as a trapezoidal shape, a pentagonal shape, a hexagonal shape, an octagonal shape, another polygonal shape, a circular shape or an elliptical shape. Further, the liquid crystal display panel 2 also may have a shape based on the display area 12, such as a trapezoidal shape, a pentagonal shape, a hexagonal shape, an octagonal shape, another polygonal shape, a circular shape or an elliptical shape. The shape of the liquid crystal display panel 2 is not necessarily the same as that of the display area 12. They may have different shapes. In addition, the liquid crystal display panel 2 may be deformed in an antiplane direction, and thus, may be a curved panel.

The liquid crystal display panel 2 has a touch detection function for detecting a touch with the detection object O on the display surface 11. To realize a display function and a touch detection function, the display device 1 having a touch detection function comprises a drive controller 40. The drive controller 40 comprises a display drive controller 50 which controls driving for displaying an image on the display surface 11, and a sensor drive controller 60 which controls driving for detecting a touch with the detection object O on the display surface 11.

Now, this specification explains the specific structure of the liquid crystal display panel 2, mainly, the display area 12. The specification further explains the specific structures of the display drive controller 50 and the sensor drive controller 60.

On the inner surface of the first substrate 3 comprises n gate lines 20 and m data lines 21 at positions corresponding to the display area 12. Further, on the inner surface of the first substrate 3, a plurality of pixel electrodes 22 and a plurality of common electrodes 26 are formed.

The gate lines 20 extend in a first direction X and are arranged at intervals in a second direction Y perpendicular to the first direction X.

The data lines 21 extend in the second direction Y and are arranged at intervals in the first direction X. By this structure, the data lines 21 intersect with the gate lines 20 in a plan view.

As described above, the gate lines 20 intersect with the data lines 21 in a plan view. Thus, a plurality of pixel areas 27 defined by the gate lines 20 and the data lines 21 are formed in the display area 12. The pixel areas 27 are arranged in matrix in the first and second directions X and Y in the display area 12. In the display area 12, m×n pixel areas 27 are formed, where m and n are positive integers.

The first direction X must intersect with the second direction Y. In the above explanation, the first direction X is perpendicular to the second direction Y. However, the intersecting state includes a state other than a perpendicular state. For example, the first direction X may be substantially perpendicular to the second direction Y.

As described above, the pixel areas 27 are arranged in matrix in the present embodiment. In consideration of this structure, the first direction X and the second direction Y are also called a row direction and a column direction, respectively, in the following explanation.

The gate lines 20 and the data lines 21 are linearly formed in the present embodiment. However, the gate lines 20 and the data lines 21 may be curved partially or at a plurality of positions. For example, the gate lines 20 and the data lines 21 may be bent in each pixel area 27 such that the lines have a wave shape.

As shown in FIG. 4, each pixel area 27 includes the pixel electrode 22, and a pixel switching element 28 which connects the pixel electrode 22 and the data line 21. Each common electrode 26 is provided so as to face a plurality of pixel electrodes 22. In the present embodiment, for example, 400 pixel electrodes (=20 pixel electrodes×20 pixel electrodes) face one common electrode 26. In the display area 12, a plurality of common electrodes 26 are arranged in matrix.

The pixel switching element 28 is formed by a thin-film transistor (TFT). The gate electrode of the thin-film transistor is connected to the gate line 20. The source electrode is connected to the data line 21. The drain electrode is connected to the pixel electrode 22.

FIG. 5 is a cross-sectional view schematically showing the layer structure of the liquid crystal display panel 2. The cross-sectional view of FIG. 5 is taken along dashed line X-X' of FIG. 4. FIG. 5 shows the cross-sectional surface of pixel switch 28a, the cross-sectional surface of select switching element 81a, the cross-sectional surface of pixel switch 28b and the cross-sectional surface of select switching element 81b.

As shown in FIG. 5, the first substrate 3 is attached to the second substrate 4 via a sealing material (not shown) so that a predetermined cell gap G is made. The sealing material is provided in a rectangular formed in the non-display area 13 along around the display area 12. The liquid crystal layer 5 is encapsulated in the space surrounded by the first substrate 3, the second substrate 4 and the sealing material. A plurality of spacers 7 which keep the cell gap G constant are provided between the pair of substrates 3 and 4.

The first substrate 3 is formed using a first insulating substrate 3a having a phototransmissive property, such as a glass substrate or a resin substrate. A plurality of light-shielding layers 31 formed of metal are provided in an island form on a surface (inner surface) of the first insulating substrate 3a so as to face the second substrate 4. A first insulating layer 32 is formed so as to cover the inner surface of the first insulating substrate 3a and the light-shielding layers 31.

A semiconductor layer 33, which is a channel layer, is formed at a position corresponding to the light-shielding layers 31 on the first insulating layer 32. Further, on the first insulating layer 32, a gate insulating film 34 is formed so as to cover the semiconductor layer 33. On the gate insulating layer 34, each gate line 20 is formed at a position facing the semiconductor layer 33.

Over the inner surface of the first insulating substrate 3a, further, a second insulating layer 35 is provided so as to cover the gate lines 20 and the gate insulating film 34. On the second insulating layer 35, a plurality of data lines 21 are formed. In the same layer as the data lines 21, a pair of electrode portions 36 (36a and 36b) is formed at a position facing the semiconductor layer 33. The pair of electrode portions 36 (36a and 36b) is in contact with the semiconductor layer 33 via the second insulating layer 35 and the gate insulating film 34. Each pixel switching element 28 is formed by the gate lines 20, the semiconductor layer 33 and the pair of electrode portions 36.

In the present embodiment, a top-gate TFT is employed as each pixel switching element 28. However, a bottom-gate TFT may be employed. In other words, the lower position of the semiconductor layer 33 and the upper positions of the gate lines 20 may be reversed. In addition, the semiconductor layer 33 of each pixel switching element 28 is formed of low-temperature polysilicon. However, the semiconductor layer 33 may be formed of amorphous silicon.

A planarization film 37 is provided so as to cover the data lines 21, the pair of electrode portions 36 and the second insulating layer 35. On the planarization film 37, a third insulating layer 38 is provided. On the third insulating layer 38, the common electrodes 26 are provided.

As shown in FIG. 3 to FIG. 5, each common electrode 26 has a rectangular shape having a size which is allowed to face a plurality of pixel areas 27 (for example, 20 pixel electrodes×20 pixel electrodes) in the display area 12. The common electrodes 26 are arranged in matrix in the first direction X and the second direction Y.

In the present embodiment, as described above, a plurality of common electrodes 26 are arranged in matrix. Thus, the common electrodes 26 are also used as sensor electrodes for touch detection. The specific structure as sensor electrodes is explained later.

A fourth insulating layer 39 is formed so as to cover the common electrodes 26 provided in a tile form, and the third insulating layer 38. On the fourth insulating layer 39, each pixel electrode 22 is formed.

Every pixel area 27 comprises a pixel electrode 22. The pixel electrode 22 faces the common electrode 26 via the fourth insulating layer 39. The pixel electrode 22 has a comb shape such that a slit 24 and a line portion 25 are alternately provided. The pixel electrode 22 is in contact with the electrode portion 36 of the pixel switching element 28 via the third insulating layer 38.

Each common electrode 26 and each pixel electrode 22 are formed of a transparent conductive material such as ITO or IZO. The insulating layers 32, 35, 38 and 39, the gate insulating film 34 and the planarization film 37 are formed of, for example, an organic insulating material such as polyimide resin, or an inorganic insulating material such as silicon nitride or silicon oxide.

A first alignment film (not shown) which defines the initial alignment of the liquid crystal molecules of the liquid crystal layer 5 is provided so as to cover the pixel electrodes 22 and the fourth insulating layer 39.

The second substrate 4 is formed using a second insulating substrate 4a having a phototransmissive property, such as a glass substrate or a resin substrate. The second insulating substrate 4a comprises, for example, a black matrix 8 provided at a position facing the gate lines 20 and the data lines 21, a color filter 10, an overcoat layer and a second alignment film AL2 (none of them is shown) on a side facing the first substrate 3.

In the above pixel structure, an electric field is produced between the pixel electrodes 22 and the common electrodes 26. Thus, a fringe electric field can be generated between the pixel electrodes 22 and the common electrodes 26 via the slits 24 of the pixel electrodes 22. By the fringe electric field, the orientation of the alignment of the liquid crystal molecules of the liquid crystal layer 5 is changed. In this way, the optical characteristics of the liquid crystal layer 5 vary depending on the pixel area 27. As a result, it is possible to display an image on the display surface 11. The display mode using a fringe electric field is called a fringe field switching (FFS) mode.

As shown in FIG. 3, the display drive controller 50 comprises a gate line drive circuit 51 which drives the gate lines 20, a multiplexer 53 which controls an image signal transmitted to the data lines 21, and a main controller 54 which controls the gate line drive circuit 51 and the multiplexer 53. Out of these circuits, the gate line drive circuit 51 and the multiplexer 53 are formed on the first substrate 3. The main controller 54 is formed as an IC chip, and is mounted on the first substrate 3. The gate line drive circuit 51 and the multiplexer 53 are electrically connected to the main controller 54 via control lines 56a and 56b.

Figure 6:
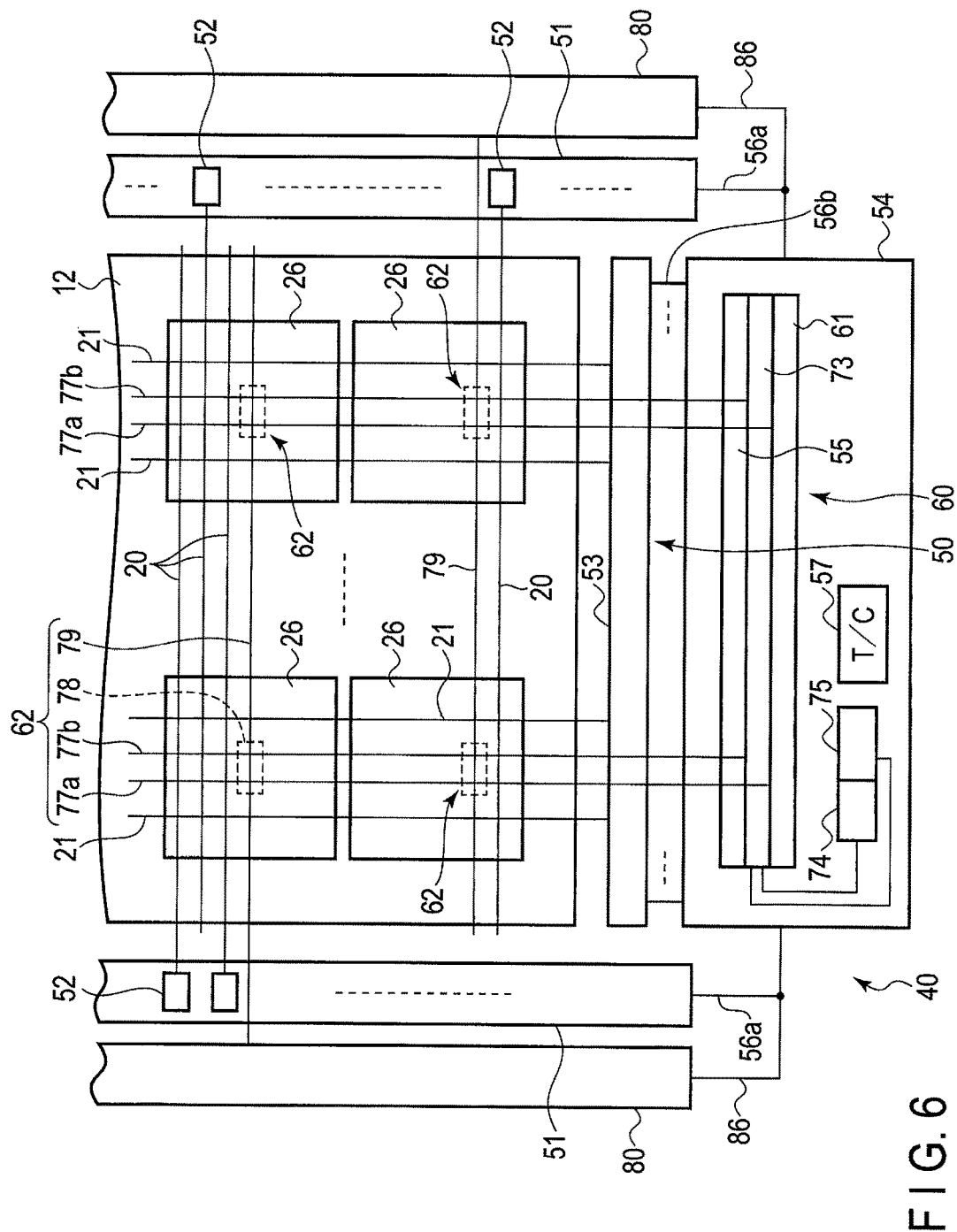
FIG. 6 is a plan view schematically showing the structure of a controller provided in the liquid crystal display device having a touch detection function according to the first embodiment.

As shown in FIG. 6, the main controller 54 comprises a data line drive circuit 55 for driving the data lines 21. The main controller 54 further comprises a timing controller (a controller) 57 for controlling the data line drive circuit 55, the gate line drive circuit 51 and the multiplexer 53.

The gate lines 20 formed in the display area 12 extend to the non-display area 13, and are connected to the gate line drive circuit 51. The gate line drive circuit 51 comprises a plurality of gate shift registers 52 electrically connected to each other. The gate lines 20 are connected to the gate shift registers 52 in a one-to-one relationship.

The data lines 21 extend to the outside of the display area 12, and are connected to the multiplexer 53.

As shown in FIG. 3, a flexible wiring 58 is provided at a position facing the main controller 54 on the first substrate 3. The flexible wiring 58 connects an external control module (not shown) such as an external application processor to the main controller 54. Note, above the wiring may be called an interconnection.

In the present embodiment, a sensor drive controller 60 for detecting a touch with the detection object O on the display surface 11 is further formed on the liquid crystal display panel 2. More specifically, a structure for using the common electrodes 26 which contribute to display as sensor electrodes SE and driving the common electrodes 26 so as to function as sensor electrodes SE is formed in the display area 12 and the non-display area 13.

As shown in FIG. 3 and FIG. 6, By the sensor drive controller 60 supplies a sensor signal to the common electrodes 26, the common electrodes 26 function as sensor electrodes SE. The sensor drive controller 60 comprises a sensing circuit 61 which detects presence or absence of a touch based on a sensor signal, and a select circuit 62 which selects one of the common electrodes 26 as a sensor electrode SE. The sensor drive controller 60 comprises a common electrode drive circuit 73 for supplying a signal to the common electrodes 26 separately from the sensing circuit 61.

The select circuit 62 comprises a pair of third wirings 77a and 77b facing the common electrode 26, a switch portion 78 which connects the pair of third wirings 77a and 77b to the common electrode 26, a switch line 79 connected to the switch portion 78, and a switch drive circuit 80 connected to the switch line 79 in the non-display area 13. The switch portion 78 is formed for each common electrode 26.

As shown in FIG. 3 and FIG. 4, in the display area 12, a plurality of third wirings 77 extend in the second direction Y, which is the extension direction of the data lines 21. The third wirings 77 are provided at predetermined intervals in the first direction X. In the present embodiment, the third wirings 77 are provided at positions which overlap or substantially overlap the data lines 21 in a plan view. The third wirings 77 are formed on the planarization film 37 and are covered by the third insulating layer 38 together with the planarization film 37 such that the third wirings 77 overlap the data lines 21 (see FIG. 5 for each layer).

Note, in FIG. 4, etc., the third wirings 77 are shown at positions which do not overlap the data lines 21 so that the entire structure can be understood.

As described above, the third wirings 77 overlap the data lines 21. With this structure, each common electrode 26 faces the same number of third wirings 77 as the number of data lines 21.

The third wirings 77 are not limited to the above structure. The number of third wirings 77 may be any number as long as at least one pair of third wirings 77a and 77b is provided for each common electrode 26.

The switch portion 78 provided in the select circuit 62 comprises a pair of select switching elements 81 (81a and 81b) formed between the pair of third wirings 77a and 77b and the common electrode 26.

As shown in FIG. 4, each common electrode 26 comprises a pair of select switching elements 81a and 81b. Each of select switching elements 81a and 81b is provided in a corresponding pixel area 27. In the pixel area 27 in which each select switching element 81 is provided, the area of the pixel electrode 22 is reduced by the area of the select switching element 81. More specifically, the line portions 25 corresponding to each select switching element 81 are shortened. In the space generated by this structure, each select switching element 81 is formed.

In the pixel area 27 in which each select switching element 81 is provided, the opening rate subjected to display is reduced by the area of the select switching element 81. Thus, the luminance is reduced. In terms of this factor, as the pixel in which each select switching element 81 is provided, the pixel area 27 corresponding to blue (B) is desirable.

As shown in FIG. 5, each select switching element 81 is formed by a thin-film transistor (TFT) having a structure similar to that of each pixel switching element 28 which connects the pixel electrode 22 and the data line 21.

More specifically, each select switching element 81 comprises a semiconductor layer 82 formed in the same layer as the semiconductor layer 33 of the pixel switching element 28, and a pair of electrode portions 83a and 83b in the same layer as the pair of electrode portions 36a and 36b of the pixel switching element 28. The pair of electrode portions 83a and 83b is in contact with the semiconductor layer 82 via the gate insulating film 34. A light-shielding layer 84 is provided at a position facing the semiconductor layer 82 of the select switching element 81. The light-shielding layer 84 is formed in the same layer as the light-shielding layer 31 of the pixel switching element 28.

In the present embodiment, the light-shielding layer 84, the semiconductor layer 82 and the pair of electrode portions 83a and 83b in each select switching element 81 are formed in the same layers as the structures of each pixel switching element 28. In this way, each select switching element 81 can be formed in the steps for forming each pixel switching element 28. Thus, it is possible to prevent increase in the number of steps caused by forming each select switching element 81. However, each structure of each select switching element 81 may be formed in a layer or way different from those of each pixel switching element 28.

Regarding the select switching elements 81, the third wirings 77 (77a and 77b) are in contact with electrode portions 83a on the source side via the planarization film 37. The common electrode 26 is in contact with electrode portions 83b on the drain side via the third insulating layer 38 and the planarization film 37. In this way, a pair of select switching elements 81a and 81b connected to each common electrode 26 is formed.

Select switching element 81a is connected to third wiring 77a, and select switching element 81b is connected to third wiring 77b. These select switching elements 81a and 81b have phases opposite to each other.

More specifically, select switching element 81a is formed as an n-TFT. Select switching element 81b is formed as a p-TFT. These structures may be reversed.

As shown in FIG. 4, both select switching element 81a and select switching element 81b are connected to the switch line 79.

Each switch line 79 is formed in the same layer as the gate lines 20, and is covered by the second insulating layer 35 in the same manner as the gate lines 20 (see FIG. 5).

As shown in FIG. 3, each switch line 79 extends in the first direction X, which is the extension direction of each gate line 20. The switch lines 79 are provided at predetermined intervals in the second direction Y. More specifically, one switch line 79 is provided for a plurality of common electrodes 26 arranged in each row.

In the above structure, the switch portion 78 (see FIG. 6) switches the state of connection between the third wirings 77 and the common electrode 26 as follows.

When a switch signal is input to the switch line 79, select switching element 81a is set to an on-state in response to the signal. The common electrode 26 is connected to third wiring 77a. At this time, select switching element 81b is set to an off-state in response to the switch signal. The common electrode 26 is disconnected from third wiring 77b.

Similarly, in a state where a switch signal is not supplied to the switch line 79, select switching element 81a is set to an off-state. The common electrode 26 is disconnected from third wiring 77a. At this time, select switching element 81b is set to an on-state. The common electrode 26 is connected to third wiring 77b.

One switch line 79 is provided for a plurality of common electrodes 26 arranged in each row. The switch lines 79 are connected to the switch portions 78 of the common electrodes 26. Therefore, as described above, when a switch signal is input to one of the switch lines 79, the common electrodes (or the group of common electrodes) 26 in a row corresponding to the switch line 79 are selected from all the common electrodes 26, and are connected to third wirings 77a. The other common electrodes 26 are not selected, and are connected to third wirings 77b.

As shown in FIG. 3 and FIG. 6, the other structures of the sensor drive controller 60 are formed in the non-display area 13.

More specifically, the switch line drive circuit 80, the common electrode drive circuit 73 and the sensing circuit 61 are provided in the non-display area 13. The switch line drive circuit 80 is formed along the gate line drive circuit 51 in the non-display area 13. The common electrode drive circuit 73 and the sensing circuit 61 are incorporated into the IC chip which is the main controller 54.

The switch line drive circuit 80 is connected to the main controller 54 via a control line 86. The switch lines 79 formed in the display area 12 extend to the non-display area 13, and are connected to the switch line drive circuit 80.

A pair of third wirings 77a and 77b extends to the main controller 54. Third wiring 77a is connected to the sensing circuit 61, and third wiring 77b is connected to the common electrode drive circuit 73.

Figure 7:
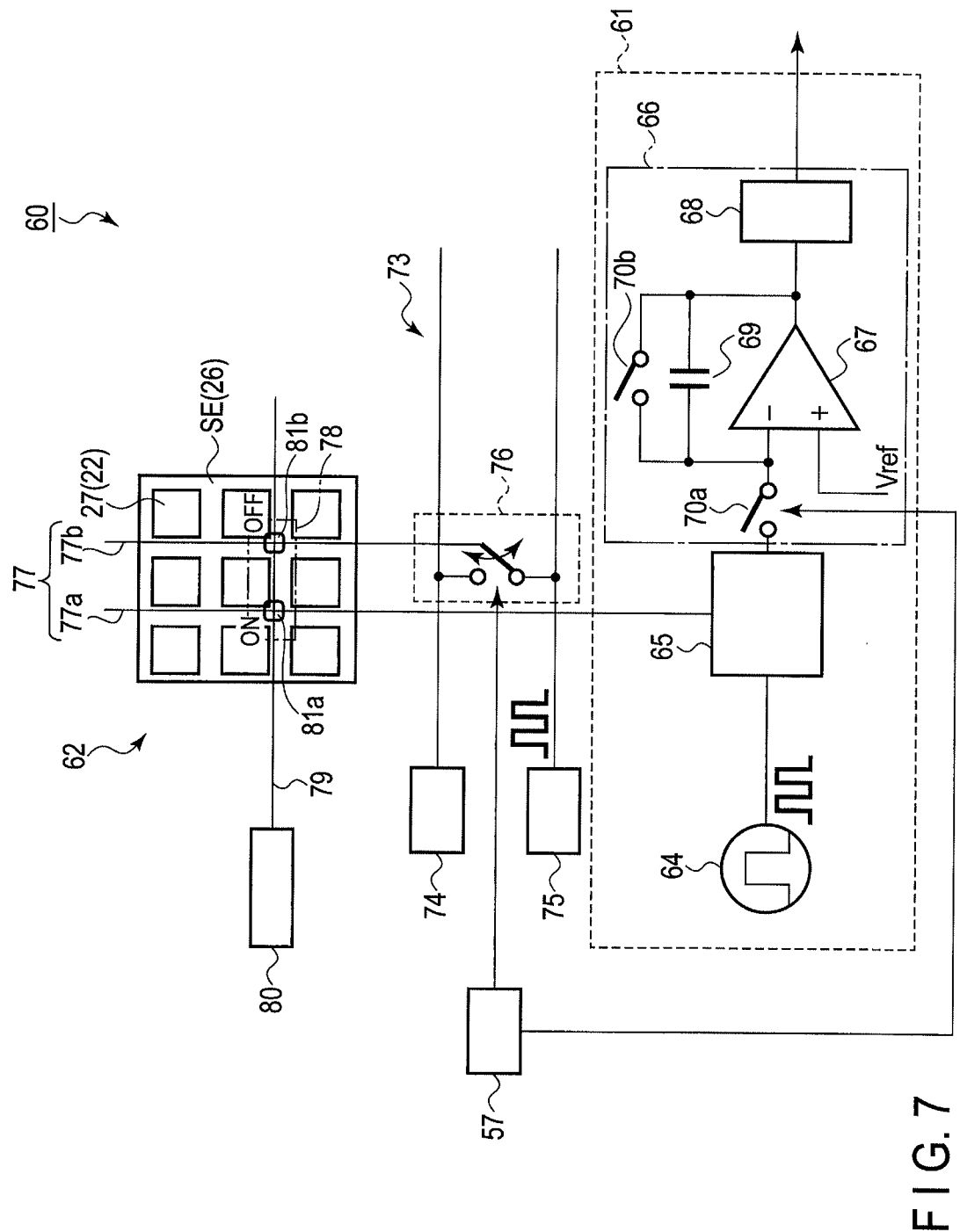
FIG. 7 is a plan view schematically showing the circuit structure of a sensor drive controller provided in the liquid crystal display device having a touch detection function according to the first embodiment.

As shown in FIG. 7, the common electrode drive circuit 73 comprises a common signal generation module 74 which is set to a predetermined voltage such as GND voltage, a guard signal generation module 75 which generates a predetermined pulse wave, and a common signal select switch 76 which switches the state of connection between third wiring 77b and the two signal generation modules 74 and 75. When the common signal select switch 76 is connected to the common signal generation module 74, a common signal set to a predetermined voltage is input to third wiring 77b. When the common signal select switch 76 is connected to the guard signal generation module 75, a guard signal having a predetermined pulse wave is input to third wiring 77b.

The sensing circuit 61 is a circuit for realizing touch detection by a self-capacitive system, and comprises a sensor signal generation module 64, a mirror circuit 65 and a detection circuit 66. The sensor signal generation module 64 generates a predetermined pulse wave as a sensor signal. The pulse wave has the same waveform as that of the pulse wave of the guard signal generation module 75.

The mirror circuit (current mirror circuit) 65 is connected to the sensor signal generation module 64 on the upstream side, and is connected to third wiring 77a on the downstream side. The mirror circuit 65 is connected to the detection circuit 66. The mirror circuit 65 has this state of connection. Thus, when a sensor signal is supplied from the sensor signal generation module 64 to third wiring 77a, the same signal as the sensor signal is input to the detection circuit 66 as it is.

The detection circuit 66 comprises a switch 70a, a comparator 67, an A/D converter 68 and a filter 69.

The comparator 67 receives a sensor signal via the mirror circuit 65. The connection between the comparator 67 and the common electrode 26 selected as a sensor electrode SE is switched by switch 70a provided in the former stage of the comparator 67. A capacitor 72 and a switch 70b are connected to the comparator 67 in parallel. The output of the comparator 67 is reset by switching switch 70b. The timing controller 57 controls switching switch 70a and switch 70b.

The A/D converter 68 converts the value output by the comparator 67 into a digital signal, and outputs it to an external processing circuit (not shown). A calculation process is performed in the processing circuit based on the data from each detection circuit 66. In this way, the position of a touch is specified.

As described above, the detection circuit 66 is provided for each select circuit 62. More specifically, one detection circuit 66 is provided for the common electrodes (or the group of common electrodes) 26 in one column connected to a pair of third wirings 77a and 77b. Thus, it is enough, wherein at least one detection circuit 66 is provided for each column of common electrodes 26. Therefore, the number of detection circuits 66 is less than that of common electrodes 26.

Figure 8:
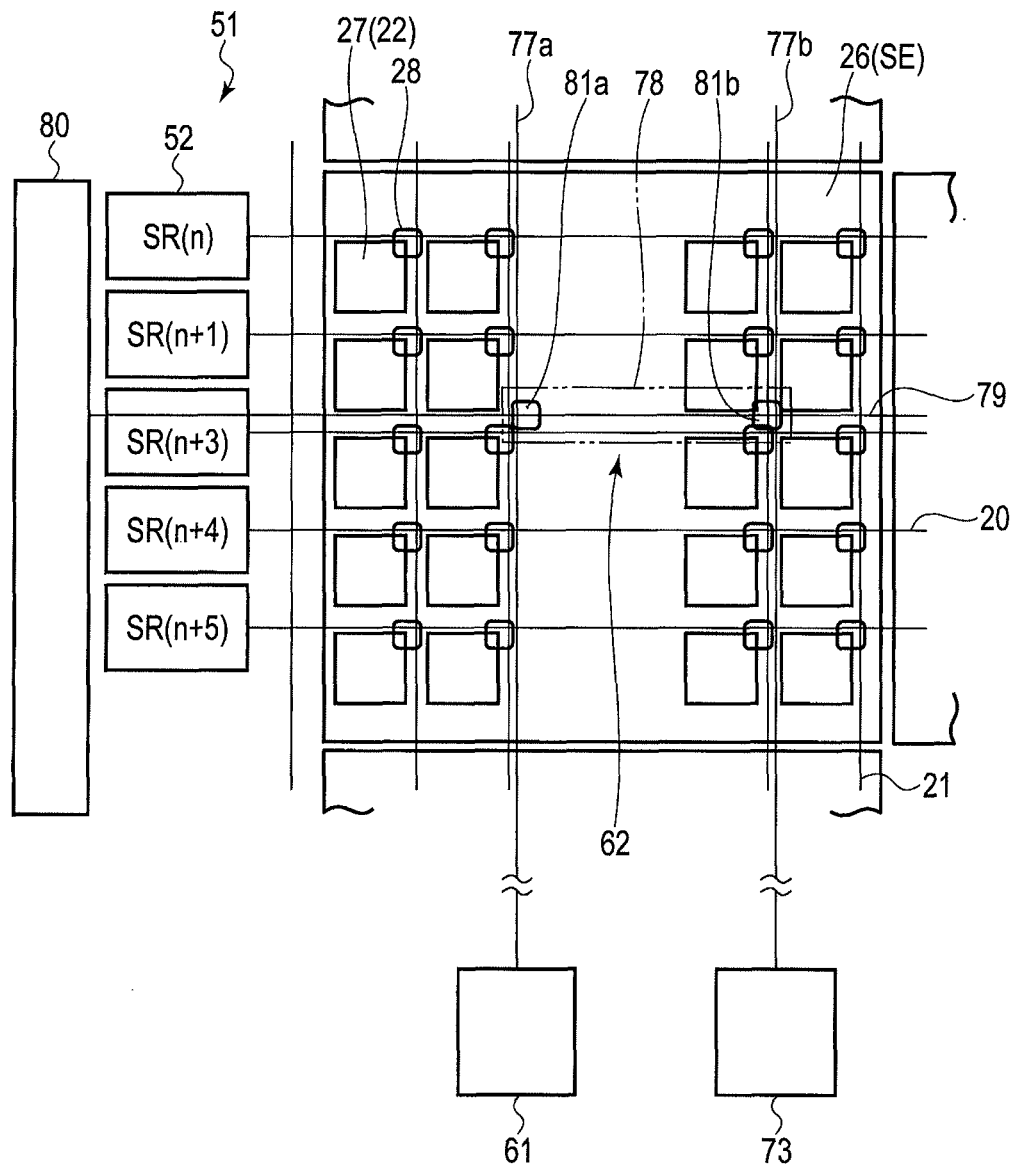
FIG. 8 is a plan view schematically showing an enlarged view of some structures of the liquid crystal display device having a touch detection function according to the first embodiment.

In the present embodiment, the display device 1 having a touch detection function has the above structure. Now, this specification explains a method of driving the display device 1 having a touch detection function with reference to the circuits shown in FIG. 8 and FIG. 9 and the timing chart shown in FIG. 10.

As shown in FIG. 10, in the present embodiment, the display device 1 having a touch detection function is controlled by the drive controller 40. By this control, a display period (Display) for displaying an image on the display surface 11 and a sensor period (Touch) for detecting a touch on the display surface 11 are alternately provided. This control is performed in series based on a clock signal from the timing controller 57 of the drive controller 40.

In a display period, a clock signal is input from the timing controller 57 to the common signal select switch 76. And the common signal select switch 76 is connected to the common signal generation module 74. Thus, the common signal generation module 74 is electrically connected to third wiring 77b. Since no signal is supplied to the switch drive circuit 80, select switching element 81a is set to an off-state, and select switching element 81b is set to an on-state. In this manner, the connection between third wiring 77a and the common electrode 26 is set to an off-state. The connection between third wiring 77b and the common electrode 26 is set to an on-state.

In the above manner, a signal is supplied from the common signal generation module 74 to the common electrode 26 connected to third wiring 77b. As described above, no switch signal is supplied to the switch line drive circuit 80. Thus, a common signal is supplied from the common signal generation module 74 to all the common electrodes 26 in the display area 12. Thus, each common electrode 26 is set to a predetermined voltage.

At this time, a signal is input to the gate shift registers 52 of the gate line drive circuit 51 of the display drive controller 50 in a time-divisional manner. Thus, the gate signal is supplied to the pixel switching elements 28 via the gate lines 20. Thus, the pixel switching elements 28 are set to an on-state. At this time, an image signal is supplied to the pixel electrodes 22 in an on-state via the data line drive circuit 55 and the multiplexer 53. The image signal is written to the pixel electrodes 22.

Thus, a fringe electric field is generated between the common electrodes 26 and the pixel electrodes 22 in an on-state. The optical characteristics of the liquid crystal layer 5 are changed by the fringe electric field. In this way, an image is displayed in the pixel areas 27.

In a display period, the gate shift registers 52 vertically adjacent to each other are operated in order from the upper side. Thus, the pixel areas 27 in several tens to several hundreds of rows are scanned in a line-sequential system. In this way, an image is displayed in series.

After the display period ends, a sensor period starts. In the sensor period, the common signal select switch 76 is switched from the common signal generation module 74 to the guard signal generation module 64 based on the clock signal from the timing controller 57. Thus, a pulse signal is input from the guard signal generation module 75 to the common electrode 26 connected to third wiring 77b.

At the same time, a clock signal is supplied from the timing controller 57 to the switch drive circuit 80 via the control line 86. Based on the clock signal, a switch signal is supplied to one switch line 79. The switching state of the switch portions 78 connected to the switch line 79 is changed.

More specifically, when a switch signal is supplied to the switch portions 78, select switching elements 81a in an off-state are set to an on-state, and select switching elements 81b in an on-state are set to an off-state. Thus, the state of connection between the common electrodes 26 corresponding to the switch portions 78 and third wirings 77b is set to an off-state. The state of connection between the common electrodes 26 corresponding to the switch portions 78 and third wirings 77a is set to an on-state. Thus, the common electrodes 26 are electrically disconnected from the common electrode drive circuit 73, and are connected to the sensing circuit 61.

A plurality of common electrodes 26 in each row are connected to a corresponding switch line 79. When a switch signal is supplied from one switch line 79 as described above, the common electrodes 26 in a row corresponding to the switch line 79 are connected to the sensing circuit 61. Thus, these common electrodes 26 are selected as sensor electrodes SE. The other common electrodes 26 are connected to the guard signal generation module 75.

In this way, in the sensor period, the common electrodes 26 which belong to the row specified by a switch signal have work as sensor electrodes SE. Touch detection is performed by these sensor electrodes SE. Specifically, a pulse signal from the sensor signal generation module 64 is supplied to each sensor electrode SE. Further, the same signal as the pulse signal is input to the detection circuit 66 via the mirror circuit 65.

When the detection object O is in contact with the display surface 11 facing the sensor electrodes SE, the pulse signal from the sensor signal generation module 64 is changed by the effect of the detection object O. The change in the pulse signal passes through the comparator 67, is converted into digital data by the A/D converter 68, and is transmitted to the subsequent processing circuits.

While touch detection is performed by the sensor electrodes SE, a guard signal is input from the guard signal generation module 75 to the other common electrodes 26.

The guard signal has the same waveform as that of the sensor signal generated by the sensor signal generation module 64. In the present embodiment, both the sensor signal and the guard signal are predetermined pulse signals. At the same time as (in synchronization with) writing the sensor signal to the common electrodes 26 which belong to the specific row, the guard signal is written to the other common electrodes 26.

Thus, the same signal as the sensor signal of the sensing circuit 61 is supplied to the other common electrodes 26 in a state where the common electrodes 26 are not connected to the sensing circuit 61. In this manner, occurrence of capacitance between the sensor electrodes SE and the common electrodes 26 around the sensor electrodes SE is reduced as much as possible.

Touch detection by a self-capacitive system is performed by detecting change in the charge in connection with change in the capacitance of the sensor electrodes SE. The change in capacitance includes change in capacitance between the detection object O and the sensor electrodes SE necessary for touch detection as well as change in capacitance between the sensor electrodes SE and the other electrodes around the sensor electrodes SE unnecessary for touch detection. To solve this problem, as described above, a guard signal is input to the common electrodes 26 other than the sensor electrodes SE. Thus, generation of unnecessary change in capacitance can be reduced or prevented as much as possible. Further, it is possible to reduce the proportion of unnecessary change in capacitance included in capacitance for touch detection. In this way, the detection circuit 66 is capable of receiving change in the capacitance of the sensor electrodes SE in a state where the proportion of change in capacitance caused by the detection object is increased. As a result, detection accuracy can be further improved.

The same pulse wave is written to a sensor electrode SE and the common electrodes 26 adjacent to the sensor electrode SE at the same time. Thus, electric force lines with equal electric force are formed from all the common electrodes 26 toward the upper side.

In general, lines of electric force have repulsion each other. In the present embodiment, it is possible to exert the effect of lines of electric force from the sensor electrodes SE on the upper side in comparison with when the guard signal having the same waveform as that of the sensor signal is not output by the common electrodes 26 around the sensor electrodes SE. In this manner, it is possible to detect a detection object O relatively far from the display surface 11. As a result, even when the sensor electrodes SE are apart from the detection object O by providing a glass cover, etc., over the liquid crystal display panel 2, detection accuracy is sufficiently maintained. Even when the sensor electrodes SE are provided on a deep side (on the backlight side) relative to the display surface 11, detection accuracy is sufficiently maintained. It is possible to detect a detection object O even when the detection object O is apart from the sensor electrodes SE such that the detection object O is not directly in contact with the sensor electrodes SE.

As shown in FIG. 10, in the present embodiment, touch detection is performed using the common electrodes 26 in a row in each sensor period.

After the sensor period has passed, a display period starts again. To switch the sensor period to the display period, the supply of a switch signal to the switch line drive circuit 80 is stopped. Thus, the state of connection of the switch portion 78 of the common electrode 26 selected as a sensor electrode SE is switched. More specifically, select switching element 81a connected to third wiring 77a is changed from an on-state to an off-state. Select switching element 81b connected to third wiring 77b is changed from an off-state to an on-state. In this manner, the state of connection between the common electrodes 26 selected as sensor electrodes SE and the third wirings 77 is the same as that between the other common electrodes 26 and the third wirings 77. At the same time, the common signal select switch 76 is switched such that the connection destination of third wiring 77b is changed from the guard signal generation module 75 to the common signal generation module 74.

In this way, all the common electrodes 26 are connected to the common signal generation module 74 via third wirings 77b. At the same time, an image signal is written to the pixel electrodes 22. Thus, display is performed. After the display period has passed, sensing is performed using the common electrodes 26 in a row different from (in the present embodiment, in the row immediately below) that of the common electrodes selected in the earlier sensor period. The operation of each circuit in these display and sensor periods is the same as that of the above display period. Thus, detailed description thereof is omitted.

In the present embodiment, the display device 1 having a touch detection function comprises the select circuit 62 such that the specific common electrodes 26 are selected as sensor electrodes SE in each sensor period, and the sensor electrodes SE are connected to the sensing circuit 61. Thus, there is no need to provide the same number of detection circuits 66 as the number of common electrodes 26. The number of detection circuits 66 may be less than the number of common electrodes 26. As a result, it is possible to flexibly deal with increase in the number of common electrodes 26 in connection with realization of high-accuracy touch detection or with increase in the size of the display area 12. Moreover, it is possible to flexibly respond to reduction in the size of frame, in other words, reduction in the width of the non-display area 13.

The switch portions 78 which switch the state of connection between the common electrodes 26 and the sensing circuit 61 are provided in the display area 12. In this manner, it is possible to prevent expansion of the non-display area 13 caused by the presence of the switch portions 78. Since the switch portions 78 are formed in the steps for forming the normal display area 12, it is possible to prevent increase in the number of manufacturing steps in connection with formation of the switch portions 78.

In a sensor period, a guard signal having the same waveform as that of a sensor signal is supplied to the common electrodes 26 other than the common electrodes 26 selected as sensor electrodes SE. Thus, generation of capacitance between the sensor electrodes SE and the other common electrodes 26 is reduced or prevented. In this manner, the accuracy in touch detection can be improved.

Second Embodiment

Now, this specification explains a display device 15 having a touch detection function according to a second embodiment. The display device 15 having a touch detection function is different from the display device of the first embodiment in terms of the structure of a switch drive circuit 80. However, the other structures are the same as those of the first embodiment. Therefore, the same structures as the first embodiment are denoted by the same reference numbers as the first embodiment, detailed description thereof being omitted.

FIG. 11 is a plan view schematically showing a part of the liquid crystal display device 15 having a touch detection function according to the present embodiment.

As shown in FIG. 11, a switch line 79 extends to a non-display area 13, and is connected to a switch line shift register 87.

The shift register 87 is provided at some midpoint among gate shift registers 52, and is connected to the gate shift registers 52 adjacent to the switch line shift register 87.

In the drive method of the present embodiment, a display period for displaying an image is performed by linearly scanning a display area 11 in series in a state where the gate shift registers 52 are driven in series. When a signal is supplied from the gate shift register 52 to the switch line shift register 87, switch portions 78 of common electrodes 26 in a row corresponding to the switch line 79 are activated. Thus, the common electrodes 26 in the row are selected as sensor electrodes SE. In this way, a sensor period starts. At the same time, a common signal select switch 76 is switched from a common signal generation module 74 to a guard signal generation module 75 in a manner similar to that of the first embodiment.

In the present embodiment, the switch line shift register 87 is incorporated between a plurality of gate shift registers 52. Thus, there is no need to further provide the switch line drive circuit 80 outside a gate line drive circuit 51. This structure is different from that of the first embodiment. In this way, the size of frame can be further reduced. The shift registers in the gate line drive circuit 51 automatically switch the period between a display period and a non-display period. Thus, the circuit structure of a drive controller 40 can be simplified.

Third Embodiment

Now, this specification explains a display device 16 having a touch detection function according to a third embodiment. In the display device 16 having a touch detection function, the structures of common electrodes 26 and third wirings 77 are different from those of the first embodiment. However, the other structures are the same as those of the first embodiment. Thus, the same structures as the first embodiment are denoted by the same reference numbers as the first embodiment, detailed description thereof being omitted.

As shown in FIG. 12, in the present embodiment, a pair of switch lines 79 adjacent to each other in a second direction Y is connected to each other. More specifically, an end portion of switch line 79a extends to a non-display area 13, and is connected to a switch line drive circuit 80. The other end portion of switch line 79a extends to the non-display area 13. An end portion of switch line 79b adjacent to switch line 79a also extends to the non-display area 13, and is connected to the other end portion of switch line 79a.

The switch lines 79 face a plurality of common electrodes 26 arranged in a row direction, and are connected to the common electrodes 26 via switch portions 78 (in a manner similar to that of the first embodiment). A pair of third wirings 77a and 77b is provided in each common electrode 26. Out of these third wirings 77a and 77b, third wiring 77a is connected to a sensing circuit 61, and third wiring 77b is connected to a common electrode drive circuit 73.

In the present embodiment, in each sensor period, the common electrodes 26 in two rows connected to each other can be collectively selected as sensor electrodes SE. Thus, the total sensor period can be reduced by half.

In the present embodiment, a structure of connecting two switch lines 79 adjacent to each other is employed. However, a structure of connecting three or more switch lines 79 may be employed.

Fourth Embodiment

Now, this specification explains a display device 17 having a touch detection function according to a fourth embodiment. In the display device 17 having a touch detection function, the structures of common electrodes 26 and third wirings 77 are different from those of the first embodiment. However, the other structures are the same as those of the first embodiment. Thus, the same structures as the first embodiment are denoted by the same reference numbers as the first embodiment, detailed description thereof being omitted.

In the explanation below, select switching element 81a is referred to as a positive select switching element 81a, and select switching element 81b is referred to as a negative select switching element 81b.

As shown in FIG. 13, in the display device 17 of the present embodiment, one or more pairs of third wirings 77 (77a, 77a, 77b and 77b) are connected to each common electrode 26 via switching elements. In FIG. 13, four third wirings 77 are connected to each common electrode 26 via select switching elements 81. More specifically, out of these four third wirings 77, two third wirings 77 are connected to each common electrode 26 via the positive select switching elements 81a. The other two third wirings 77 are connected to each common electrode 26 via the other negative select switching elements 81b.

The two third wirings 77 connected to the positive select switching elements 81a extend to a non-display area 13, and are connected to each other and to a sensing circuit 61. The two third wirings 77 connected to the negative select switching elements 81b extend to the non-display area 13, and are connected to each other and to a common electrode drive circuit 73.

Out of the plurality of select switching elements 81, at least a pair of positive and negative select switching elements 81a and 81b is connected to one switch line 79. The other pair of positive and negative select switching elements 81a and 81b is connected to a different switch line 79. Thus, in the present embodiment, two switch lines 79 are provided for common electrodes 26 in each row.

The pair of switch lines 79 extends to the non-display area 13, and is connected to each other and to a switch line drive circuit 80.

In the present embodiment, a plurality of third wirings 77 (77a and 77a) are connected to each common electrode 26 via the positive select switching elements 81a and 81a. A plurality of third wirings 77 (77b and 77b) are connected to each common electrode 26 via the negative select switching elements 81b and 81b. Thus, even if a problem occurs in, for example, one of the select switching elements 81, the touch detection function of the common electrode 26 is not degraded. As a result, the yield rate of the display device 17 having a touch detection function is improved. Further, when the device is used, the failure rate is reduced.

In the present embodiment, a structure of connecting four third wirings 77 to each common electrode 26 is employed. However, a structure of connecting more than four third wirings 77, such as six or eight third wirings 77, to each common electrode 26 may be employed. In the present embodiment, two of four third wirings 77 are connected to the positive select switching elements 81a. The other two third wirings 77 are connected to the negative select switching elements 81b. However, one of the third wirings 77 may be connected to the positive select switching element 81a, and the other three third wirings 77 may be connected to the negative select switching elements 81b. Thus, the number of third wirings 77 connected to the positive select switching elements 81a may not be equal to the number of third wirings 77 connected to the negative select switching elements 81b.

Fifth Embodiment

Now, this specification explains a display device 18 having a touch detection function according to a fifth embodiment. In the display device 18 having a touch detection function, the structures on the first substrate 3 side are the same as those of the first embodiment. Thus, the same structures as the first embodiment are denoted by the same reference numbers as the first embodiment, detailed descriptions thereof being omitted.

Figure 14:
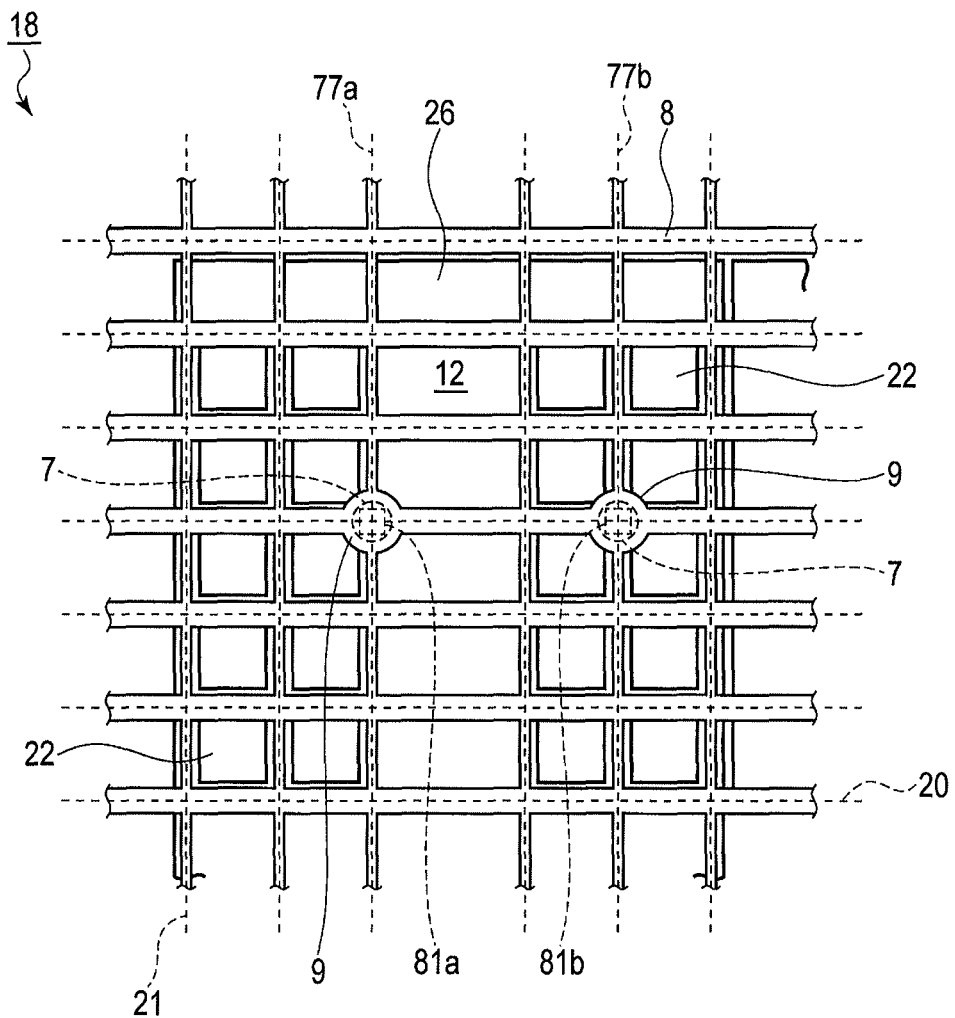
FIG. 14 is a plan view schematically showing an enlarged view of some structures of a liquid crystal display device having a touch detection function according to a fifth embodiment.

As shown in FIG. 14, in the present embodiment, a spacer 7 is provided at a position overlapping a select switching element 81 in a plan view.

A black matrix 8 is provided on a second substrate 4. The black matrix 8 is provided at positions overlapping each gate line 20 and each data line 21 in order to shield them against light. Thus, the black matrix 8 has the shape of a lattice. The black matrix 8 comprises a shielding portion 9 at a position corresponding to the spacer 7. The shielding portion 9 corresponding to the spacer 7 is slightly larger than the spacer 7.

In the present embodiment, the select switching element 81 overlaps the spacer 7. The spacer 7 is covered by the shielding portion 9. Thus, the select switching element 81 is also shielded by the black matrix 8 against light. As a result, the visibility of the select switching element 81 is reduced although the select switching element 81 is provided in a display area 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, a select circuit may not be provided in one or some of the common electrodes 26 such that the common electrodes 26 which do not comprise a select circuit cannot be selected as sensor electrodes SE.

The common electrodes 26 in a plurality of rows or all rows may be selected as sensor electrodes SE in series in one sensor period.

In the above embodiments, as the display device 1 and a method of driving the display device 1, this specification exemplarily discloses a liquid crystal display device and a method of driving the liquid crystal display device. However, as the display device of each embodiment, various flat panel display devices can be considered. For example, organic electro-luminescent (EL) display devices, other self-luminous display devices, and electronic paper display devices having an electrophoresis element can be considered. As a matter of course, the above embodiments may be applied to small, medium-sized or large display devices without particular limitation.

The above embodiments also have features as the following touch detection methods.

(1a) A touch detection method of a display device comprising:
a plurality of gate lines;
a plurality of data lines intersecting with the gate lines;
a plurality of pixel electrodes provided in areas defined by the gate lines and the data lines; and
a plurality of common electrodes facing the pixel electrodes,
the method comprising:
selecting at least one of the common electrodes as a sensor electrode;
detecting a touch by using the sensor electrode; and
inputting, to the other common electrodes, a guard signal which reduces generation of capacitance between the other common electrodes and the sensor electrode.

(1b) The above touch detection method (1a), wherein the touch detection is performed by a self-capacitive system for supplying a sensor signal to the sensor electrode and detecting change in the sensor signal.

(1c) A touch detection method of a display device comprising:
a plurality of gate lines;
a plurality of data lines intersecting with the gate lines;
a plurality of pixel electrodes provided in areas defined by the gate lines and the data lines; and
a plurality of common electrodes facing the pixel electrodes,
the method comprising:
selecting at least one of the common electrodes as a sensor electrode; and
subsequently detecting a touch by a self-capacitive system for supplying a sensor signal to the sensor electrode and detecting change in capacitance of the sensor signal.

(1d) The above touch detection method (1c), wherein a guard signal for reducing generation of capacitance between the other common electrodes and the sensor electrode is input to the other common electrodes concurrently with the supply of the sensor signal to the sensor electrode.

What is claimed is:

1. A display device comprising:
a plurality of gate lines;
a plurality of data lines intersecting with the gate lines;
a plurality of pixel electrodes provided in areas defined by the gate lines and the data lines;
a plurality of common electrodes opposing to the pixel electrodes; and
a sensor drive controller which detects a touch by using the common electrodes, wherein
the sensor drive controller comprises:
a sensor signal generation module which inputs a sensor signal to the common electrodes;
a guard signal generation module which inputs a guard signal to the common electrodes;
a select circuit which selectively connects one of the signal generation modules to the common electrodes; and
a common signal generation module, the select circuit comprises:
- a first wiring provided along the common electrodes and connected to the sensor signal generation module;
- a second wiring provided along the common electrodes;
- a common signal select switch which selectively connects the second wiring to one of the guard signal generation module and the common signal generation module; and
- a switch portion which switches a state of connection between the first wiring and second wiring and the common electrode, the sensor drive controller controls the switch portion and the common signal select switch of the select circuit, and the sensor drive controller connects at least one of the common electrodes to a sensor signal generation module in a state that at least one of the switch portions connects the first wiring to the common electrode and functions the common electrode as a sensor electrode, detects a touch by using the sensor electrode, and connects the other common electrodes to the guard signal generation module in a state that the other switch portions connect the second wirings to the common electrodes and the common signal select switches connect the second wirings to the guard signal generation module, the guard signal reducing an occurrence of capacitance between the other common electrodes and the sensor electrode.

2. The display device of claim 1, wherein
the sensor drive controller detects a touch as a self-capacitive system when the common electrode functions as the sensor electrode.

3. The display device of claim 1, wherein
the guard signal has a waveform identical to a waveform of a sensor signal, and is input to the common electrodes other than the common electrode selected as the sensor electrode concurrently with the sensor signal.

4. The display device of claim 1, further comprising:
a liquid crystal layer facing the pixel electrodes and the common electrodes;
a display drive controller outputting a signal which generates an electric field between the pixel electrodes and the common electrodes, and changes an optical state of the liquid crystal layer; and
a main controller which controls the display drive controller and the sensor drive controller, wherein
the main controller is configured to alternately perform a display period for driving the liquid crystal layer by controlling the display drive controller and a sensor period for detecting a touch by controlling the sensor drive controller.

5. The display device of claim 1, wherein
one of a plurality of detection circuits for detecting a touch is assigned to the common electrodes arranged along the first wiring and second wiring, and
the detection circuits are less than the common electrodes in number.

6. A display device comprising:
a plurality of gate lines;
a plurality of data lines intersecting with the gate lines;
a plurality of pixel electrodes provided in areas defined by the gate lines and the data lines;
a plurality of common electrodes facing the pixel electrodes; and
a sensor drive controller which detects a touch by using the common electrodes, wherein
the sensor drive controller comprises:
- a sensor signal generation module which inputs a sensor signal to the common electrodes;
- a guard signal generation module which inputs a guard signal to the common electrodes;
- a select circuit which selectively connects one of the signal generation modules to the common electrodes; and
- a common signal generation module, the select circuit comprises:
- a first wiring provided along the common electrodes and connected to the sensor signal generation module;
- a second wiring provided along the common electrodes;
- a common signal select switch which selectively connects the second wiring to one of the guard signal generation module and the common signal generation module; and
- a switch portion which switches a state of connection between the first wiring and second wiring and the common electrode, the sensor drive controller controls the switch portion and the common signal select switch of the select circuit, and the sensor drive controller connects at least one of the common electrodes to a sensor signal generation module in a state that at least one of the switch portions connects the first wiring to the common electrode and functions the common electrode as a sensor electrode, and detects a touch as a self-capacitive system, when the common electrode functions as the sensor electrode.

7. The display device of claim 6, wherein
the sensor drive controller inputs, to the common electrodes other than the common electrode selected as the sensor electrode, a guard signal for reducing occurrence of capacitance between the other common electrodes and the sensor electrode.

8. The display device of claim 7, wherein
the guard signal has a waveform identical to a waveform of the sensor signal, and is input to the common electrodes other than the common electrode selected as the sensor electrode concurrently with the sensor signal.

9. The display device of claim 7, further comprising:
a liquid crystal layer facing the pixel electrodes and the common electrodes;
a display drive controller outputting a signal which generates an electric field between the pixel electrodes and the common electrodes to changes an optical state of the liquid crystal layer; and
a main controller which controls the display drive controller and the sensor drive controller, wherein
the main controller is configured to alternately perform a display period for driving the liquid crystal layer by controlling the display drive controller and a sensor period for detecting a touch by controlling the sensor drive controller.

10. The display device of claim 9, wherein
the sensor drive controller applies a predetermined voltage to each common electrode in the display period.

11. The display device of claim 7, wherein
the switch portion comprises:
a pair of select switching elements; and a switch line for inputting a switch signal to the pair of select switching elements,
one of the select switching elements connects the first wiring to the common electrode, and
the other select switching element connects the second wiring to the common electrode.

12. The display device of claim 11, wherein
the switch lines are connected to the pair of select switching elements, respectively, and
the select switching elements have phases opposite to each other, and when one of the select switching elements is set to an on-state in response to a signal from the switch line, the other select switching element is set to an off-state.

13. The display device of claim 11, further comprising a gate line drive circuit which scans the gate lines in series, wherein
the gate line drive circuit comprises a plurality of gate shift registers connected to the gate lines, respectively, and further comprises switch line shift registers which are connected to the gate shift registers and scan the switch lines subsequent to the gate shift registers.

14. The display device of claim 11, wherein
the switch line is electrically connected to a different switch line, and a switch signal for these switch lines is shared.

15. The display device of claim 11, further comprising:
a spacer which maintains a cell gap of the liquid crystal layer; and
a shielding portion which shields the spacer, wherein
each of the select switching elements is formed at a position overlapping the spacer.

16. A display device comprising:
a plurality of gate lines;
a plurality of data lines intersecting with the gate lines;
a plurality of pixel electrodes provided in areas defined by the gate lines and the data lines;
a plurality of common electrodes facing the pixel electrodes, each of the common electrodes facing two or more of the pixel electrodes; and
a sensor drive controller which detects a touch by using the common electrodes, wherein
the sensor drive controller comprises:
    a sensor signal generation module which inputs a sensor signal to the common electrodes;
    a guard signal generation module which inputs a guard signal to the common electrodes;
    a select circuit which selectively connects one of the signal generation modules to the common electrodes; and
    a common signal generation module,
the select circuit comprises:
    a first wiring provided along the common electrodes and connected to the sensor signal generation module;
    a second wiring provided along the common electrodes;
    a common signal select switch which selectively connects the second wiring to one of the guard signal generation module and the common signal generation module; and
    a switch portion which switches a state of connection between the first wiring and second wiring and the common electrode,
the sensor drive controller controls the switch portion and the common signal select switch of the select circuit,
the sensor drive controller connects at least one of the common electrodes to a sensor signal generation module in a state that at least one of the switch portions connects the first wiring to the common electrode and functions the common electrode as a sensor electrode and detects a touch by using the sensor electrode,
one of a plurality of detection circuits for detecting a touch is assigned to the common electrodes arranged along the first wiring and the second wiring, and
the detection circuits are less than the common electrodes in number.

17. The display device of claim 16, wherein
the sensor drive controller detects a touch as a self-capacitive system for supplying a sensor signal to the common electrode connected via the select circuit and detecting change in the sensor signal.

18. A touch detection method of a display device comprising:
a plurality of gate lines;
a plurality of data lines intersecting with the gate lines;
a plurality of pixel electrodes provided in areas defined by the gate lines and the data lines;
a plurality of common electrodes facing the pixel and;
a sensor drive controller which detects a touch by using the common electrodes, wherein
the sensor drive controller comprises:
    a sensor signal generation module which inputs a sensor signal to the common electrodes;
    a guard signal generation module which inputs a guard signal to the common electrodes;
    a select circuit which selectively connects one of the signal generation modules to the common electrodes; and
    a common signal generation module,
the select circuit comprises:
    a first wiring provided along the common electrodes and connected to the sensor signal generation module;
    a second wiring provided along the common electrodes;
    a common signal select switch which selectively connects the second wiring to one of the guard signal generation module and the common signal generation module; and
    a switch portion which switches a state of connection between the first wiring and second wiring and the common electrode,
the sensor drive controller controls the switch portion and the common signal select switch of the select circuit,
the method comprising:
connecting at least one of the common electrodes to a sensor signal generation module in a state that at least one of the switch portions connects the first wiring to the common electrode and functions the common electrode as a sensor electrode;
detecting a touch by using the sensor electrode; and
connecting the other common electrodes to the guard signal generation module in a state that the other switch portions connect the second wirings to the common electrodes and the common signal select switches connect the second wirings to the guard signal generation module, a guard signal for reducing generation of capacitance between the other common electrodes and the sensor electrode.

* * * * *